(12) United States Patent
Kwon et al.

(10) Patent No.: US 9,384,513 B2
(45) Date of Patent: Jul. 5, 2016

(54) APPARATUS FOR COLLECTING CONTENTS USING SOCIAL RELATION CHARACTER AND METHOD THEREOF

(71) Applicant: KOREA INSTITUTE OF SCIENCE AND TECHNOLOGY, Seoul (KR)

(72) Inventors: Yong-Moo Kwon, Seoul (KR); Jaehyuk Park, Yongin-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 182 days.

(21) Appl. No.: 14/091,667

(22) Filed: Nov. 27, 2013

(65) Prior Publication Data

US 2015/0052137 A1 Feb. 19, 2015

(30) Foreign Application Priority Data

Aug. 14, 2013 (KR) ........................ 10-2013-0096544

(51) Int. Cl.
*G06F 17/30* (2006.01)
*G06Q 50/00* (2012.01)

(52) U.S. Cl.
CPC .......... *G06Q 50/01* (2013.01); *G06F 17/30867* (2013.01)

(58) Field of Classification Search
CPC .......... G06F 21/6218; G06F 17/30864; G06F 17/3053
See application file for complete search history.

(56) References Cited

U.S. PATENT DOCUMENTS

| 8,452,849 | B2 | 5/2013 | Mehanna et al. | |
| 2007/0233736 | A1* | 10/2007 | Xiong | .................... G06Q 30/02 |
| 2009/0204598 | A1* | 8/2009 | Crane | ............... G06F 17/30864 |
| 2010/0281364 | A1 | 11/2010 | Sidman | |
| 2013/0132191 | A1* | 5/2013 | Galai et al. | ................. 705/14.49 |
| 2014/0019539 | A1* | 1/2014 | Novak et al. | .................. 709/204 |
| 2014/0195606 | A1* | 7/2014 | Krishnamurthy et al. | .... 709/204 |

FOREIGN PATENT DOCUMENTS

| KR | 10-2010-0006752 A | 1/2010 |
| KR | 10-2012-0048522 A | 5/2012 |
| KR | 10-2012-0137542 A | 12/2012 |
| KR | 10-2013-0065779 A | 6/2013 |
| KR | 10-2013-0082557 A | 7/2013 |

\* cited by examiner

*Primary Examiner* — Mariela Reyes
*Assistant Examiner* — Courtney Harmon

(57) ABSTRACT

Disclosed is an apparatus for collecting contents using social relation characters, which includes: an input unit for receiving search information from a main user; a database for storing SNS subscriber list of the main user and related users in relation to the main user and group information in relation to friendship in an SNS; and a content managing unit for searching contents in relation to the received search information by using the group information from contents possessed by the main user and the related users in an SNS server, defining the searched contents as a first content group, calculating a first interest index for each content included in the first content group based on additional information input by the related users, and determining a predetermined content, on which interest of the related users is focused, from the searched contents based on the calculated first interest index.

18 Claims, 6 Drawing Sheets

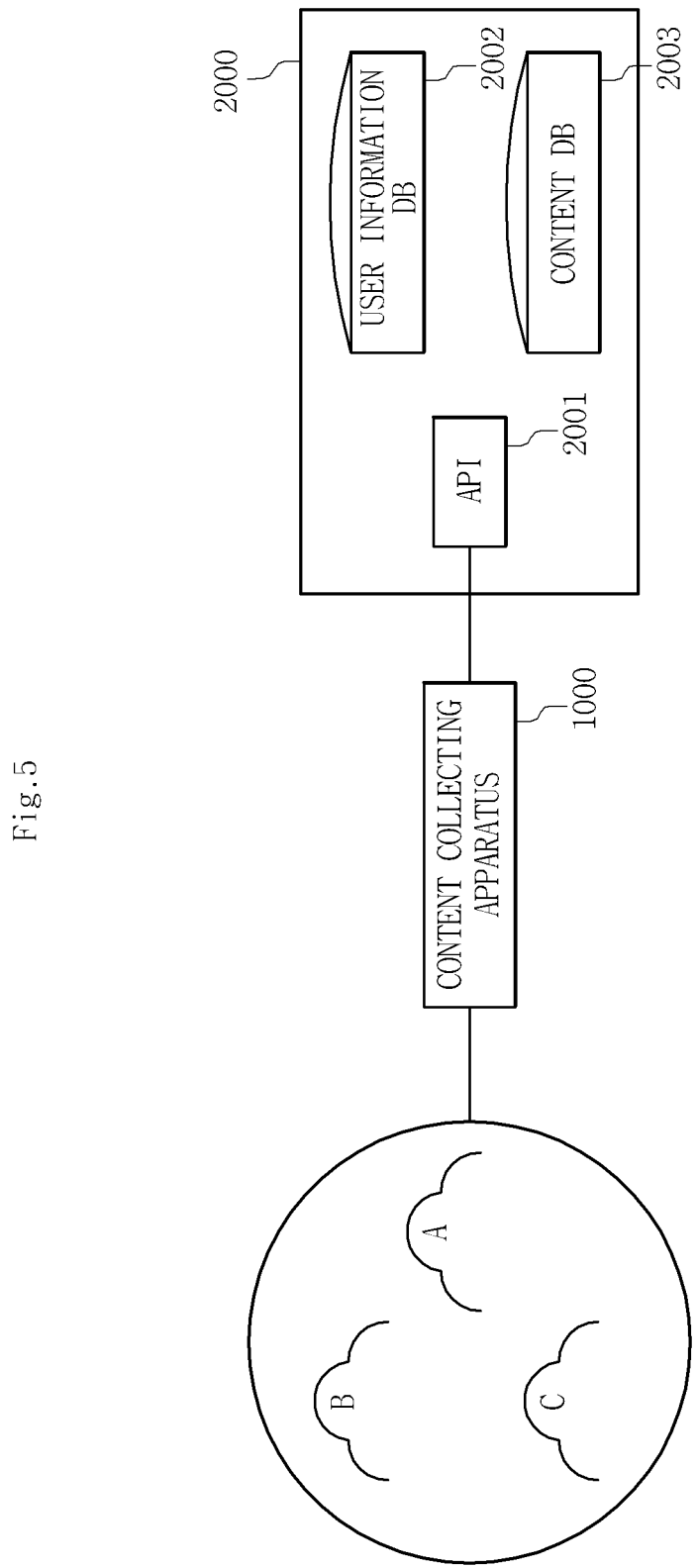

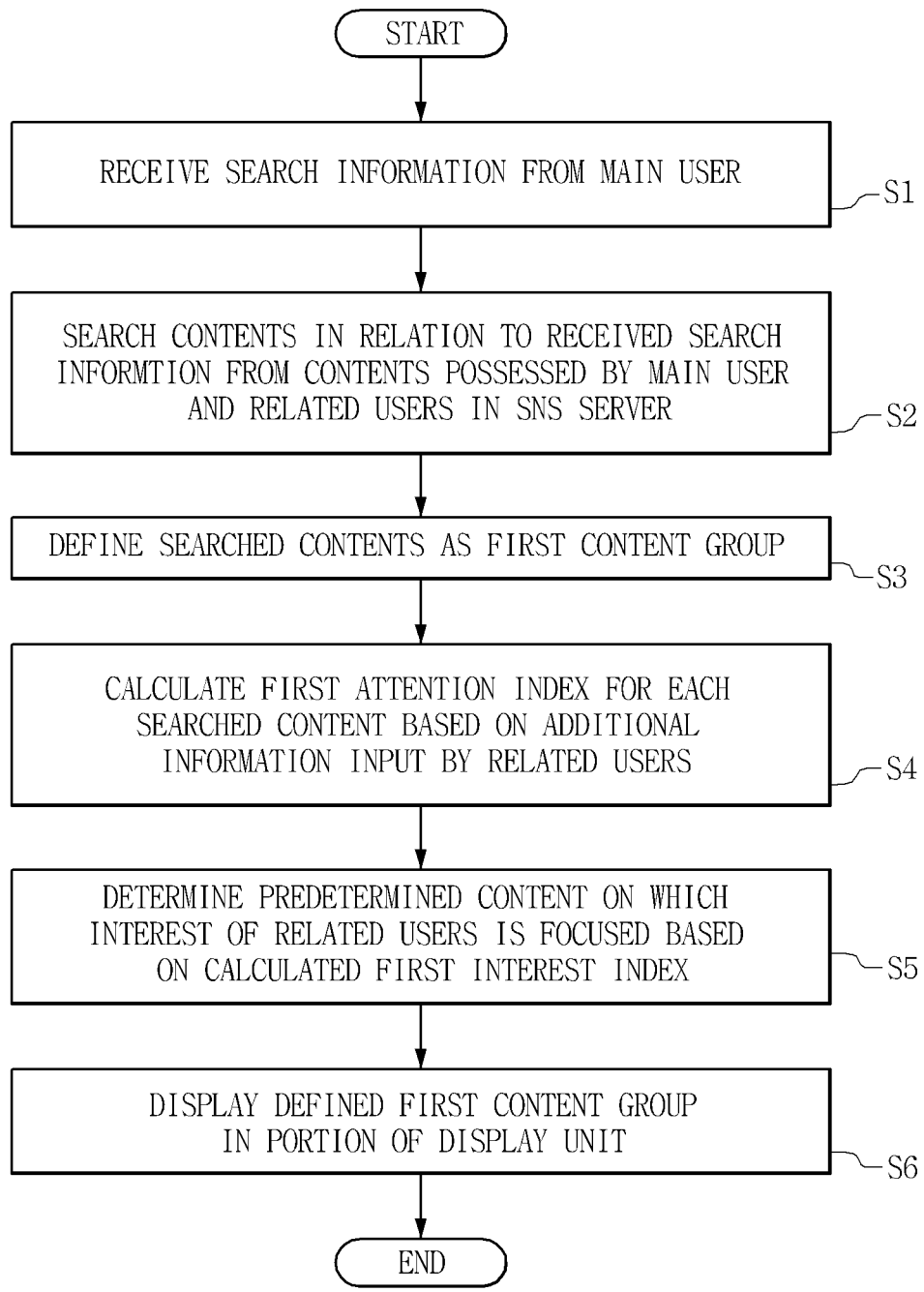

APPARATUS FOR COLLECTING CONTENTS USING SOCIAL RELATION CHARACTER AND METHOD THEREOF

CROSS-REFERENCE TO RELATED APPLICATION

This application claims priority to Korean Patent Application No. 10-2013-0096544, filed on Aug. 14, 2013, and all the benefits accruing therefrom under 35 U.S.C. §119, the contents of which in its entirety are herein incorporated by reference.

BACKGROUND

1. Field

The present disclosure relates to an apparatus and method for collecting contents, and more particularly, to an apparatus and method for collecting contents using a social relation of each user and reaction information of a social user in social network service.

2. Description of the Related Art

As mobile devices become popular in recent days, social network service (SNS) is greatly used. Accordingly, social media network service and big data market is greatly increasing in the world, and the social media network content analyzing service is increasing. Such content analyzing service is a technique for analyzing social reactions to SNS contents and generating a content based thereon and is used for various fields such as social curation, social albums, marketing based on analyzed social user characters, social advertisement, big data analysis or the like.

The scale of such a world social media market reaches 16.9 billion dollars in 2012. In addition, due to the increase of social media users, its advertisement market is expected to have a market scale of 8.8 billion dollars and the social game market is also expected to have a market scale of 6.2 billion dollars.

Moreover, in foreign countries, the curation service is activated, and particularly image social curation Pinterest is evaluated as having a great value. The social curation service is an essential factor which causes new affordance to consumers and may be applied to service including various kinds of behaviors such as news, information collection, commerce, social media or the like.

As SNS is becoming more common as described above, many persons upload contents related to a specific event to various kinds of SNS and share the contents with friends participating in the SNS. It is also becoming common to make a social album in relation to such an event, and when making a social album, there is demanded information about contents which have drawn interests from various persons and addition contents relating to the content which have drawn interests from various persons (for example, relevant news or contents uploaded by a third party).

However, if images or news relating to a specific event are automatically collected by using the existing search service, a lot of data having no relation with an actual event is included. In addition, at present, a system for searching web data related to a specific event is not provided, and only contents corresponding to a search word are collected without variation, without collecting relevant data suitable for a character of content by inferring a contextual qualitative character of content by means of reactions of friends on the SNS.

SUMMARY

The present disclosure is directed to providing an apparatus and method for inferring a character of content by means of social reactions according to the content and collecting web data in a suitable way accordingly.

In one aspect, there is provided an apparatus for collecting contents using social relation characters, which includes: an input unit for receiving search information from a main user; a database for storing a social network service (SNS) subscriber list of the main user and related users in relation to the main user and group information in relation to friendship in an SNS; and a content managing unit for searching contents in relation to the received search information by using the group information from contents possessed by the main user and the related users in an SNS server, defining the searched contents as a first content group, calculating a first interest index for each content included in the first content group based on additional information input by the related users, and determining a predetermined content, on which interest of the related users is focused, from the searched contents based on the calculated first interest index, wherein the additional information includes at least one of comment information, sharing information and likability information.

In the apparatus for collecting contents using social relation characters according to an embodiment, the content managing unit may calculate the first interest index by using Equation 1) or Equation 2) below.

$$\text{the first interest index} = \text{(the number of comments of the related users)/(the number of related users)} + \text{the number of related users who have made comments} \quad \text{Equation 1)}$$

$$\text{the first interest index} = \text{the number of related users} + \text{the number of comments of the related users} \quad \text{Equation 2)}$$

In the apparatus for collecting contents using social relation characters according to an embodiment, the content managing unit may include a first sub content managing unit which performs extracting a keyword from comments input by the related users, among comments about the predetermined content on which interest of the related users is focused, searching a content in relation to the extracted keyword from contents possessed by the main user and the related users in the SNS server, and defining the searched content as a second content group.

In the apparatus for collecting contents using social relation characters according to an embodiment, the first sub content managing unit may use a natural language process to extract the keyword, extract a plurality of keywords, and search contents by using the plurality of extracted keywords individually or by using the plurality of extracted keywords simultaneously.

In the apparatus for collecting contents using social relation characters according to an embodiment, the content managing unit may include a second sub content managing unit, which performs calculating a second interest index based on additional information input by other users than the main user and the related users with respect to each of the searched contents, and determining a predetermined content on which interest of other users is focused, from the searched contents based on the calculated second interest index.

In the apparatus for collecting contents using social relation characters according to an embodiment, the second sub content managing unit may calculate the second interest index by using Equation 3) below.

$$\text{the second interest index} = (0.5 \cdot \text{(the number of likability))} + \text{the number of other users who have made comments} + (2 \cdot \text{(the number of sharing))} \quad \text{Equation 3)}$$

In the apparatus for collecting contents using social relation characters according to an embodiment, the second sub content managing unit may perform extracting a keyword from comments input by the other users, from comments about a predetermined content on which interest of other users is focused, searching a content in relation to the searched keyword at a web server other than the SNS server, and defining the searched content as a third content group.

In the apparatus for collecting contents using social relation characters according to an embodiment, there may be provided a plurality of SNS servers.

In the apparatus for collecting contents using social relation characters according to an embodiment, the predetermined content on which interest of the other users is focused may be an image or text, and the second sub content managing unit may search contents by using a relevant image searching algorithm or a relevant new searching method, and generate the third content group composed of the searched contents.

The apparatus for collecting contents using social relation characters according to an embodiment may further include a display unit for displaying the contents of the first, second and third content groups to be independently arranged in a display area.

In the apparatus for collecting contents using social relation characters according to an embodiment, the contents of the third content group may include a news article, a blog posting and an image file.

In another aspect, there is provided a method for collecting contents using social relation characters, which includes: receiving search information from a main user; searching contents in relation to the received search information from contents possessed by the main user and related users in relation to the main user in an SNS server by using a social network service (SNS) subscriber list of the main user and the related users and group information in relation to friendship in an SNS; defining the searched contents as a first content group; calculating a first interest index for each searched content based on additional information input by the related users; and determining a predetermined content, on which interest of the related users is focused, from the searched contents based on the calculated first interest index, wherein the additional information includes at least one of comment information, sharing information and likability information.

The method for collecting contents using social relation characters according to an embodiment may further include: extracting a keyword from comments input by the related users, among comments about the predetermined content on which interest of the related users is focused; searching a content in relation to the extracted keyword from contents possessed by the main user and the related users in the SNS server; and defining the searched content as a second content group.

The method for collecting contents using social relation characters according to an embodiment may further include: calculating a second interest index based on additional information input by other users than the main user and the related users with respect to each of the searched contents; and determining a predetermined content on which interest of other users is focused, based on the calculated second interest index.

The method for collecting contents using social relation characters according to an embodiment may further include: extracting a keyword from comments input by the other users, from comments about the predetermined content on which interest of other users is focused; searching a content in relation to the searched keyword at a web server other than the SNS server; and defining the searched content as a third content group.

The method for collecting contents using social relation characters according to an embodiment may further include displaying the contents of the first, second and third content groups to be independently arranged in a display area.

According to embodiments of the present disclosure, when several users participate in making on-line social contents, albums, user created contents (UCC) or the like, opinions of the participants may be reflected to collect and arrange contents required for making a collaborative work and it is also possible to minimize search of unnecessary data.

In addition, when making a collaborative social album with contents related to a specific event, it is possible to infer characters in relation to a social relation of the contents by means of reactions of members participating in the event and automatically add web data in an appropriate manner, and it is also possible to collect contents conforming to the human intuition.

Moreover, the characters relating to the contents collected by the content collecting apparatus as described above may be used in an on-line media content recommendation system. In addition, in relation to the big data technique, the above characters may also be used for the social curation technique based on personal information, which automatically analyzes specific contents, searches relevant contents and performs crawling. Further, the above characters may also be utilized for story telling by analyzing reactions of users on the SNS.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 5 is a diagram showing a plurality of participants, a content collecting apparatus 1000 and a SNS server 2000 according to an embodiment of the present disclosure;

FIG. 7 is a flowchart for illustrating a method for collecting contents using social relation characters according to an embodiment of the present disclosure.

DETAILED DESCRIPTION

Figure 1:
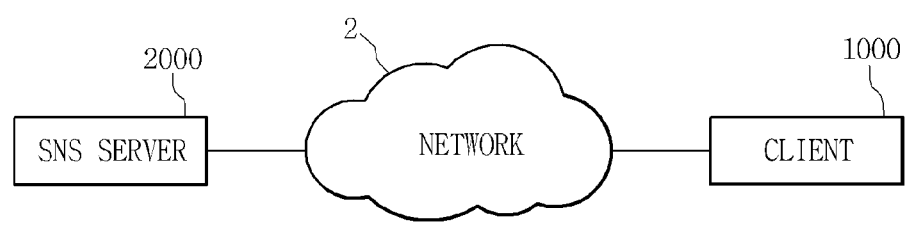
FIG. 1 is a high-level block diagram showing a computer environment 10 in which an apparatus for collecting contents using social relation characters according to an embodiment of the present disclosure operates.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. However, in the description, details of well-known features and techniques may be omitted to avoid unnecessarily obscuring the presented embodiments. In addition, the shape, size and regions, and the like, of the drawing may be exaggerated for clarity and may not mean the actual dimension.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

In addition, in the description, details of well-known features and techniques may be omitted to avoid unnecessarily obscuring the presented embodiments.

Hereinafter, embodiments of the present disclosure will be described in detail with reference to the drawings.

FIG. 1 is a high-level block diagram showing a computer environment 10 in which an apparatus for collecting contents using social relation characters according to an embodiment of the present disclosure operates. As shown in FIG. 1, the computer environment 10 may include a social network service (SNS) server 2000 and a client 1000, connected through a network 2 to communicate with each other. FIG. 1 shows just one unit of each entity for illustrating embodiments simply and clearly. In other words, other entities such as a web server or the like may be further provided in the computer environment 10.

The SNS server 2000 is a hardware device and/or a software program and is configured to provide social network service to the client 1000 or other systems. The social network service allows various kinds of contents uploaded to the SNS server 2000 by service users to be stored, shared and displayed for other service users.

The SNS server 2000 may be associated with the client 1000 to provide social meta data and recommended contents to the client 1000. In addition, there may be provided one or more SNS server 2000 associated with the computer system according to another embodiment of the present disclosure. The SNS server 2000 may be one of an on-line community server, a SNS service server and a blog service server. For example, the SNS server 2000 may include a server such as FACEBOOK®, CYWORLD®, GOOGLE®, DAUM®, NAVER®, FLICKR®, TWITER®, LINKNOW®, WEEBLY®, TODOLY®, RAINMAKER®, SEESMIC®, SLIDEROCKET®, LINKEDIN®, PINTEREST®, or the like. In addition, in an embodiment, the SNS server 2000 may be a web page such as homepages of registered friends, timeline or wall of FACEBOOK®, or the like.

Moreover, in an embodiment of the present disclosure, the content may be a multimedia content including at least one of an image, a moving picture, music, a text and so on.

The network 2 allows communication between the SNS server 2000 and the client 1000. In an embodiment, the network 2 uses standard communication techniques/protocols. Therefore, the network 2 may include links using techniques such as Ethernet, 802.11, worldwide interoperability for microwave access (WiMAX), 2G/3G/4G, digital subscriber line (DSL), asynchronous transfer mode (ATM), infiniband, PCI Express Advanced Switching or the like. Similarly, the networking protocol used on the network 2 includes multi-protocol label switching (MPLS), transmission control protocol/Internet protocol (TCP/IP), user datagram protocol (UDP), hypertext transport protocol (HTTP), simple mail transfer protocol (SMTP), file transfer protocol (FTP) or the like. Data exchanged on the network 2 may be expressed using techniques and/or formats including image data in a binary form (for example, portable network graphics (PNG)), hypertext markup language (HTML), extensible markup language (XML) or the like. Additionally, the links may be entirely or partially encrypted using an existing encryption technique such as secure sockets layer (SSL), transport layer security (TLS), virtual private networks (VPNs), Internet Protocol security (IPsec) or the like.

The client 1000 is a computer system, and the client 1000 may be a smart phone, a desktop, a laptop, a digital camera, a wearable digital device, a personal digital assistant (PDA) or a table PC. Hereinafter, the client 1000 will be referred to as an apparatus for collecting contents using social relation characters.

Figure 2:
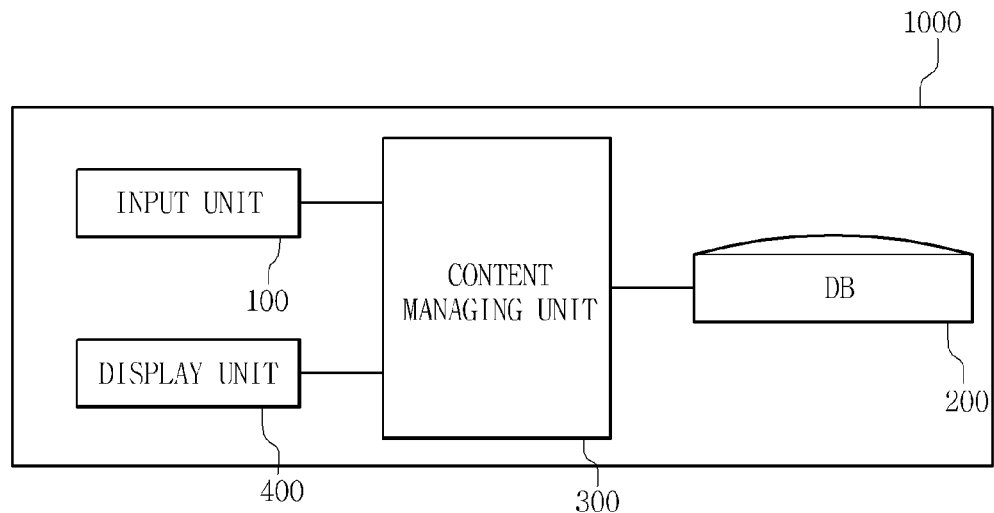
FIG. 2 is a diagram showing an apparatus for collecting contents using social relation characters 1000 according to an embodiment of the present disclosure.

FIG. 2 is a diagram showing the apparatus 1000 for collecting contents using social relation characters according to an embodiment of the present disclosure. Referring to FIG. 2, the apparatus 1000 for collecting contents using social relation characters may includes an input unit 100, a database (DB) 200, a content managing unit 300, and a display unit 400.

The input unit 100 may receive search information from a single participant (or, a main user) included in a collaborative group. Here, the collaborative group is composed of a plurality of participants. The input unit 100 may receive a user input through a device such as a keyboard, a mouse, a touch screen, a track ball or the like. In other case, data may be transmitted or received through the network of the apparatus 1000 with a user terminal, a SNS server 2000 and other web servers, and the search information may also be received from another communication device.

The search information is a search work input by the main user and may be a combination of one or more words. For example, an image name (for example, 20130808.jpg or the like), weather, location and name of a tagged person, name of another participant or the like may be input as the search information.

The plurality of participants mentioned above means a collaborative group including the participant who transmits search information to the content collecting apparatus 1000. In other words, the plurality of participants included in the collaborative group may be identified based on each user information stored in the database 200. The user information includes ID, nickname or the like, and a participant included in the collaborative group may be selected by means of subscription to the collaborative group or by a manager. Hereinafter, among participants included in the collaborative group, a person who performs searching is called a main user, and the other participants are called related users. In addition, users other than the main user and the related users are called other users.

In an embodiment, a person who inputs search information to collect contents among event participants is a main user, persons other than the main user among event participants are related users, and other users may be friends or followers of the event participants on SNS, who do not participate in the event.

The database 200 may store a social network service (SNS) subscriber list of the main user and related users in relation to the main user and group information in relation to friendship in an SNS. In other words, the database 200 stores a list of SNS in which each of the plurality of participants participates and also stores friendship information of each participant in each SNS. This is because the plurality of participants may not use the same SNS or may not be registered as friends in each SNS.

The content managing unit 300 may search contents in relation to the received search information from contents possessed by the main user and the related users in the SNS server by using the group information, and define the searched contents as a first content group. In addition, with respect to the content included in the first content group, the content managing unit 300 may calculate a first interest index based on additional information input by the related user and determine a predetermined content, on which interest of the related users is focused, based on the calculated first interest index.

The predetermined content on which interest of the related users is focused means only contents for which the related users have high interest degrees, selected from contents corresponding to the search information.

In detail, the content managing unit 300 may search the search information (query) received by the input unit 100 at the SNS server. The content managing unit 300 may search contents corresponding to the search information from all data present in the SNS server, but may also search contents corresponding to the search information from contents possessed by the main user and the related users in the SNS server. For this, the content managing unit 300 may determine a search range by checking the related users associated as SNS friends of the main user by using the group information stored in the DB 200.

In addition, in an embodiment, there may be provided a plurality of SNS servers. In addition, there may present various SNS servers (or, service) to which the main user does not subscribe or only a part of the related users subscribes, and thus the content managing unit 300 may include all contents possessed by the main user and the related users in the SNS server in the search range, based on the SNS server and friendship included in the group information.

By doing so, contents corresponding to the search information input by the main user may be searched from contents possessed by the main user and the related users in the SNS server. In the above, the expression "possess" means a state in which a user uploads content such as an image, a text or a moving picture to the SNS server or shares the content uploaded by another person so that the content is directly or indirectly associated with the user. For example, this means a state in which a picture uploaded by a user or a posting in a wall uploaded by another person is shared or re-tweeted.

The content managing unit 300 may calculate a first interest index for each of the searched contents based on additional information input by the related users. In other case, the content managing unit 300 may also calculate the first interest index based on additional information input by the main user and the related users. Here, the additional information includes at least one of comment information, sharing information and likability information. In other words, the additional information shows a trace of feelings of SNS users with respect to contents present in the SNS server. Generally, the additional information may be a comment, and depending on the kind of SNS, the uploaded content may include the number of sharing by other users, sharer information, likability information or the like.

The content managing unit 300 calculates the first interest index by using the additional information input by the related users. Therefore, the first interest index may be an index for determining interest degrees of the related users with respect to the content. Here, the related users may include the main user.

In an embodiment, the content managing unit 300 may calculate the first interest index by using Equation 1 or 2 below, but the method for calculating the first interest index is not limited thereto but may be applied in various ways depending on a user participation inducing manner provided by SNS or collected information.

$$\text{the first interest index} = (\text{the number of comments of the related users})/(\text{the number of related users}) + \text{the number of related users who have made comments} \quad \text{Equation 1}$$

$$\text{the first interest index} = \text{the number of related users} + \text{the number of comments of the related users} \quad \text{Equation 2}$$

The content managing unit 300 may determine a predetermined content, on which interest of the related users is focused, based on the first interest index calculated as above. For example, if there are too many contents, only contents whose first interest indexes are calculated as being over a certain level may be determined as predetermined contents on which interest of the related users is focused.

Figure 3:
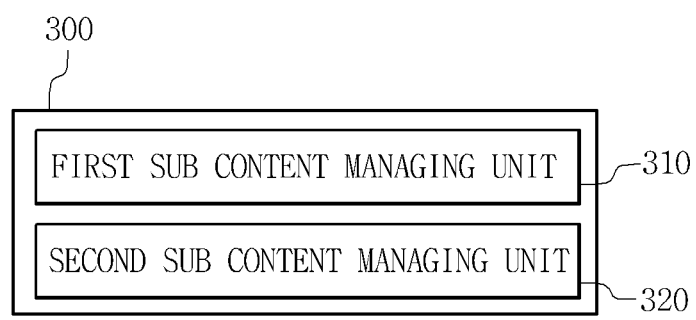
FIG. 3 is a diagram showing a content managing unit implemented according to another embodiment.

FIG. 3 is a diagram showing the content managing unit 300 implemented according to another embodiment of the present disclosure. In an embodiment, the content managing unit 300 may include a first sub content managing unit 310, which extracts a keyword from comments input by the related users, among comments about the predetermined content on which interest of the related users is focused, searches a content in relation to the extracted keyword from contents possessed by the main user and the related users in the SNS server, and defines the searched content as a second content group.

The first sub content managing unit 310 may extract a keyword by analyzing comments in relation to the predetermined content on which interest of the related users is focused. The first sub content managing unit 310 may extract a keyword based on a natural language process. For example, the first sub content managing unit 310 may extract a word or sentence most frequently mentioned in relation to the content.

After that, the first sub content managing unit 310 may search content in relation to the extracted keyword from contents possessed by the main user and the related users in the SNS server, and define the searched content as a second content group. Here, if the content included in the second content group is also included in the first content group, the corresponding content may be excluded from the second content group.

For example, if the main user inputs "2013, August, France, Paris" as search information and searches contents of the first content group, comments about all searched contents or about predetermined contents on which interest of the related users is focused is may be analyzed to extract a keyword "France, Paris" or "France". In this case, the first sub content managing unit 310 may use "France, Paris" as search information and search content from contents possessed by the main user and the related users. Accordingly, contents in relation to "France, Paris" may be searched.

As a result, even though the main user searches only contents in relation to "2013, August, France, Paris", other contents (the second content group) may also be searched in addition to the searched content (the first content group) based on comments about contents for which the related users have high interest degrees, among the searched contents. For example, the main user may be provided with contents in the second content group in relation to France, Paris in relation to the period before 2013.

As described above, the first sub content managing unit 310 may extract a plurality of keywords. In addition, the first sub content managing unit 310 may search contents with respect to each of the extracted keywords individually. In other case, the first sub content managing unit 310 may search contents with respect to the plurality of extracted keywords simultaneously. In other words, in the above case, the first sub content managing unit 310 may search contents separately for "France" and "Paris" or search contents including both "France" and "Paris".

In another embodiment, the content managing unit 300 may include second sub content managing unit 320 which calculates a second interest index based on additional information input by other users than the main user and the related users with respect to each of the searched contents, and determines a predetermined content on which interest of other users is focused, based on the calculated second interest index.

The second interest index is calculated based on additional information provided in relation to the content by other users who have no relation with the main user and the related users. For example, if the main user and the related users make the same trip and are set as a group in the group information, other users means users not included in the group information.

Therefore, the second sub content managing unit 320 may calculate the second interest index according to interest degrees of other users from the searched contents, and determine at least a part of the searched contents as a predetermined content on which interest of other users is focused, based on the calculation result.

In an embodiment, the second sub content managing unit 320 may calculate the second interest index by using Equation 3 below.

the second interest index=(0.5*(the number of likability))+the number of other users who have made comments+(2*(the number of sharing))     Equation 3

In addition, in another embodiment, the second sub content managing unit 320 may extract a keyword from comments input by the other users, from comments about a predetermined content on which interest of other users is focused, search a content in relation to the searched keyword at a web server other than the SNS server, and define the searched content as a third content group.

Here, the web server may include GOOGLE, NAVER, BAIDU, YAHOO or a certain SNS server to which no one is registered among the plurality of participants, without being limited thereto. In addition, the content of the third content group may be an image, and in this case, the second sub content managing unit 320 may search content in relation to the predetermined content on which interest of other users is focused, from the web server by using a relevant image searching algorithm or a relevant new searching method. In addition, the content of the third content group includes a news article, a blog posting, an image, a text or the like, without being limited thereto.

In an embodiment, the apparatus 1000 for collecting contents using social relation characters may include a display unit 400 for displaying the contents of the first, second and third content groups to be independently arranged in a display area.

The display unit is a display device using PDP, LCD, LED or OLED, and the display unit may include a touch screen and operate integrally with the input unit.

Figure 4A:
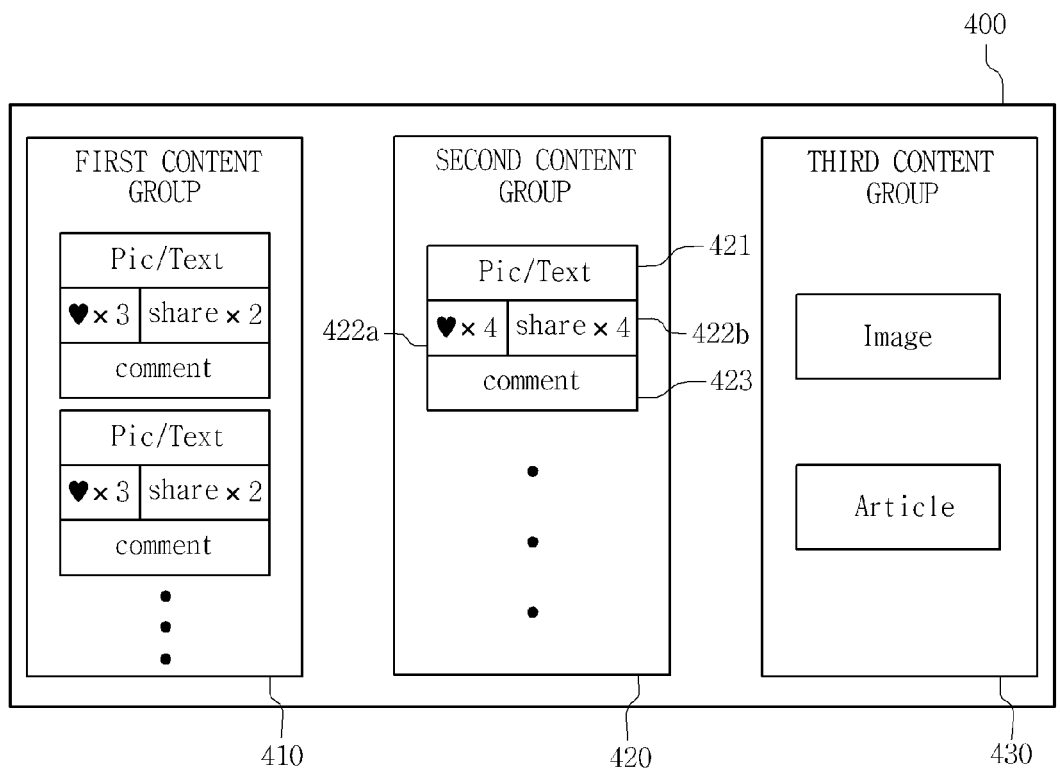
FIGS. 4*a* and 4*b* are diagrams for illustrating a function of a display unit 400.
Figure 4B:
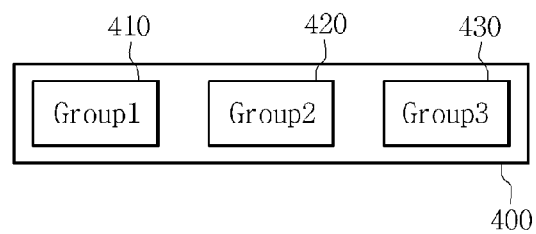

FIGS. 4a and 4b are diagrams for illustrating a function of the display unit 400. Referring to FIG. 4a, the first, second and the third content group are displayed distinguishably, and FIG. 4b displays the first to third content groups 410 to 430 schematically distinguishably. Though not shown in the figures, in an embodiment, it is also possible to display only a part of the first, second and third content groups.

In an embodiment, the display unit 400 may arrange the contents of the first, second and third content groups in the display area independently so that the contents of each group are arranged in an ascending order of the first interest index or the second interest index by using the first interest index or the second interest index. Referring to FIG. 4a, two contents are displayed in the first content group 410, for example, and a content having a higher first interest index may be disposed higher based on the first interest index.

In addition, the content described in the specification may be configured to include at least one image (or, a text may be included therein) 421, the number of likability marks 422a or the number of sharing 422b, and comments 423, as shown in FIG. 4a. In addition, the third content group may include at least one image or article (news article or blog posting).

FIG. 5 is a diagram showing a plurality of participants, a content collecting apparatus 1000 and a SNS server 2000 according to an embodiment of the present disclosure. Referring to FIG. 5, the content collecting apparatus 1000 may receive search information from the main user and provide a search result to the main user A and the related users B, C.

The SNS server 2000 may include an API unit 2001, a user information DB 2002 and a content DB 2003. The API unit 2001 may process information stored in the DB of the SNS server 2000. In addition, the user information DB 2002 stores user information of users who subscribe to the SNS server 2000, and the user information include user ID, email and friendship information among users. In addition, the content DB 2003 includes contents uploaded by users of the SNS server 2000.

The users of the SNS server are subscribers registered to the service provided by the SNS server 2000. The uploaded content includes an image, a moving picture and a text, and also includes comments, sharing, likability mark or the like added to the image, the moving picture and the text.

In an embodiment, the content managing unit 300 may communicate with the SNS server 2000 by using a communication interface (not shown), and search and collect necessary information by accessing the DB 2002, 2003 in the SNS server 2000 by using the API unit 2001.

In detail, the content managing unit 300 searches and collects contents in relation to the search information from the DB 2002, 2003 in the SNS server 2000. The content managing unit 300 may identify which user is related to the searched content by referring to the user information DB 2002. In addition, if the identified user of the content is a member of the collaborative group, the content managing unit 300 collects the contents and classifies into the first content group. Therefore, a user may identify content in relation to a participant of the collaborative group to which the user belongs, from the searched contents.

Figure 6:
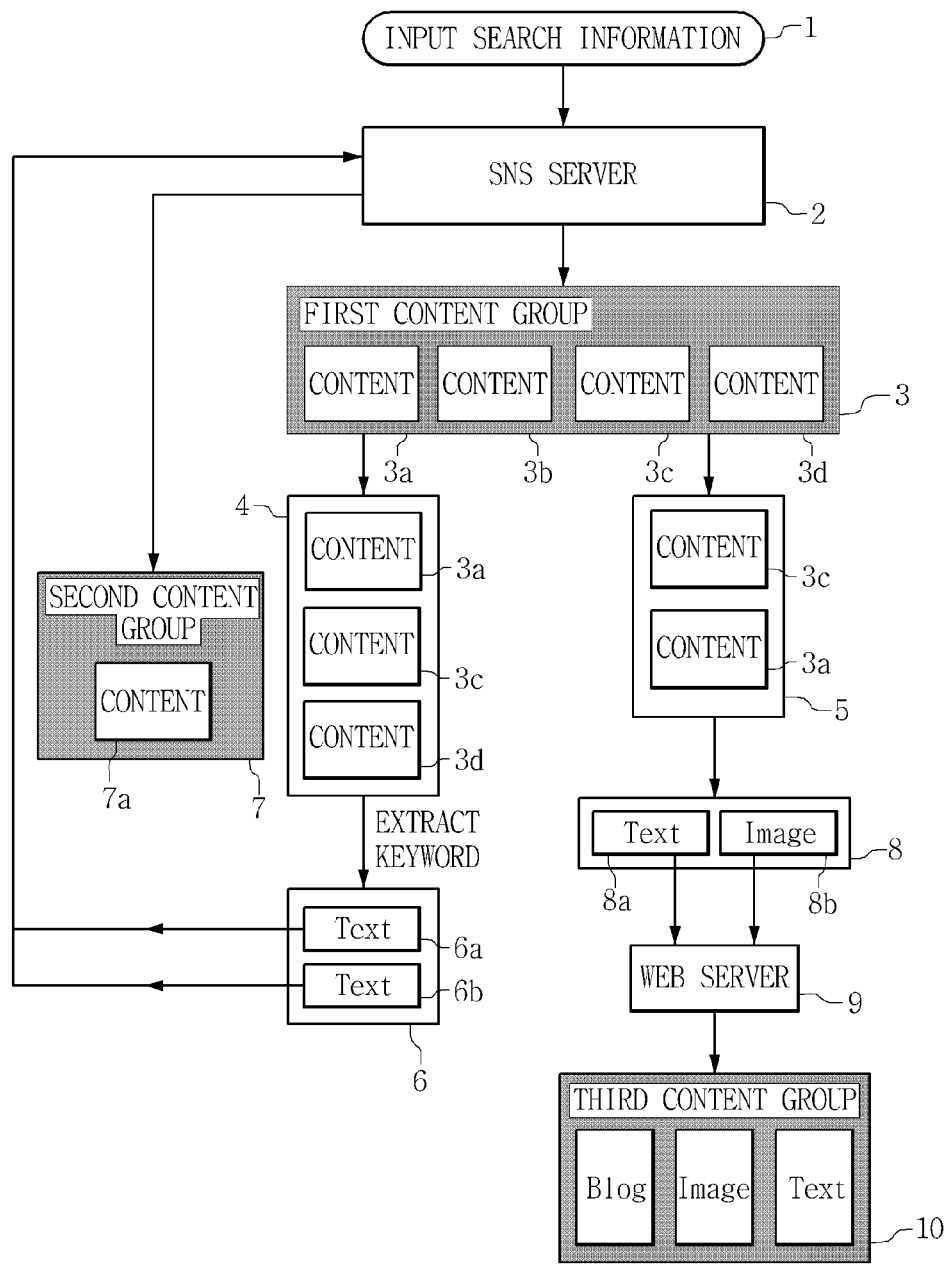
FIG. 6 is a diagram for illustrating a method for collecting contents using social relation characters according to an embodiment of the present disclosure.

FIG. 6 is a diagram for illustrating a method for collecting contents using social relation characters according to an embodiment of the present disclosure. In FIG. 6, each block may be a content group including specific contents or a stage for showing a flow of processed contents.

The description of FIG. 6 may be supplemented with reference to the above description in relation to the apparatus for collecting contents using social relation characters.

If the main user inputs search information 1, the SNS server 2 searches contents corresponding to the input search information. Here, the search range is not set to cover all contents included in the SNS server but set to cover only contents possessed by the main user and the related users who are registered as friends and have predetermined relations (designated as a group).

The searched contents 3 may be defined as a first content group. In addition, with respect to the contents included in the first content group, a first interest index may be calculated to determined predetermined contents 3a, 3c, 3d (4) on which interest of the related users is focused. In addition, a second interest index may be calculated to define at least a part of the contents 3c, 3a as predetermined contents 5 on which interest of other users is focused. The contents may be arranged in different orders depending on the size of the first interest index or the second interest index.

Comments about contents included in the predetermined contents 4 on which interest of the related users is focused are analyzed to extract keywords 6a, 6b, searching is performed at the SNS server based on the extracted keywords to collect contents 7a, and the collected contents 7a are defined as the second content group 7.

Comments about the predetermined comments 3c, 3a on which interest of other users is focused may be analyzed to extract a keyword 8a or an image 8b. In addition, relevant contents 10 may be searched from the web server 9 based on the extract keyword 8a or image 8b. Here, the predetermined comments 3c, 3a on which interest of other users is focused may be a SNS posting including an image or a text. Based on the extracted keyword or image 8a, 8b, relevant contents may be searched at the web server by using a relevant image searching algorithm or a relevant new searching method. The contents searched at the web server 9 as described above may be a blog posting, an image or a text, and such contents are defined as a third content group 10.

FIG. 7 is a flowchart for illustrating a method for collecting contents using social relation characters according to an embodiment of the present disclosure. Referring to FIG. 7, the method for collecting contents using social relation characters includes receiving search information from a main user (S1), searching contents in relation to the received search information from contents possessed by the main user and related users in relation to the main user in an SNS server by using a social network service (SNS) subscriber list of the main user and the related users and group information in relation to friendship in an SNS (S2), defining the searched contents as a first content group (S3), calculating a first interest index for each content of the first content group based on additional information input by the related users (S4), and determining a predetermined content, on which interest of the related users is focused, based on the calculated first interest index (S5), wherein the additional information includes at least one of comment information, sharing information and likability information. In other case, the method for collecting contents using social relation characters may further include displaying the defined first content group in a certain portion of the display unit (S6). This displaying process is used for distinguishably displaying content groups having different meanings.

In addition, the method for collecting contents using social relation characters may further include extracting a keyword from comments input by the related users, among comments about the predetermined content on which interest of the related users is focused, searching a content in relation to the extracted keyword from contents possessed by the main user and the related users in the SNS server, and defining the searched content as a second content group.

In another embodiment, the method for collecting contents using social relation characters may further include calculating a second interest index based on additional information input by other users than the main user and the related users with respect to each of the searched contents (the contents of the first content group), and determining a predetermined content on which interest of other users is focused, based on the calculated second interest index.

In another embodiment, the method for collecting contents using social relation characters may further include extracting a keyword from comments input by the other users, from comments about the predetermined content on which interest of other users is focused, searching a content in relation to the searched keyword at a web server other than the SNS server, and defining the searched content as a third content group. Further, the method for collecting contents using social relation characters may also further include displaying the contents of the first, second and third content groups to be independently arranged in a display area.

Though the present disclosure has been described with reference to the embodiments depicted in the drawings, it is just an example, and it should be understood by those skilled in the art that various modifications and equivalents can be made from the disclosure. However, such modifications should be regarded as being within the scope of the present disclosure. Therefore, the true scope of the present disclosure should be defined by the appended claims.

What is claimed is:

1. An apparatus for collecting contents using social relation characters, comprising a processor that comprises:
   an input unit configured to receive search information from a main user;
   a database configured to store a social network service (SNS) subscriber list of the main user and related users in relation to the main user and group information in relation to friendship in an SNS;
   a content managing unit configured to:
      search contents in relation to the received search information from among contents possessed by the main user and the related users in an SNS server by using the group information,
      define the searched contents as a first content group, calculate a first interest index for each content included in the first content group based on additional information input by the related users, the additional information comprising at least one of comment information, sharing information, or likability information, determine a predetermined content, on which interest of the related users is focused, from the searched contents based on the calculated first interest index, and calculate a second interest index equal to (n*(a number of likability)) +a number of others who have made comments +(m*(a number of sharing)), wherein n and m are numbers.

2. The apparatus according to claim 1,
wherein the content managing unit is further configured to calculate the first interest index
as the first interest index =(the number of comments of the related Users)/ (the number of related users) +the number of related users who have made comments,
or the first interest index =the number of related users +the number of comments of the related users.

3. The apparatus according to claim 1,
wherein the content managing unit is further configured to use a natural language process to extract the keyword, to extract a plurality of keywords, and to search contents by using the plurality of extracted keywords individually or by using the plurality of extracted keywords simultaneously.

4. The apparatus according to claim 1,
wherein the content managing unit is further configured to calculate the second interest index based on additional information input by other users than the main user and the related users with respect to each of the searched contents,
and to determine a predetermined content on which interest of other users is focused, from the searched contents based on the calculated second interest index.

5. The apparatus according to claim 4, wherein n=0.5 and m=2.

6. The apparatus according to claim 4,
wherein the content managing unit is further configure to:
extract a keyword from comments input by the other users, from comments about a predetermined content on which interest of other users is focused,
search a content in relation to the searched keyword at a web server other than the SNS server, and
define the searched content as a third content group.

7. The apparatus according to claim 6, further comprising a display unit for displaying the contents of the first, second and third content groups to be independently arranged in a display area.

8. The apparatus for searching contents using social relation characters according to claim 7,
wherein the contents of the third content group comprises a news article, a blog posting and an image file.

9. The apparatus according to claim 1, further comprising SNS servers.

10. The apparatus according to claim 9,
wherein the predetermined content on which interest of the other users is focused is an image or text, and
wherein the content managing unit is further configured to search contents by using a relevant image searching algorithm or a relevant new searching method, and to generate the third content group composed of the searched contents.

11. The apparatus for collecting contents using social relation characters according to claim 1, wherein the content managing unit comprises a first sub content managing unit which performs:
extracting a keyword from comments input by the related users, among comments about the predetermined content on which interest of the related users is focused,
searching a content in relation to the extracted keyword from contents possessed by the main user and the related users in the SNS server, and
defining the searched content as a second content group.

12. A method for collecting contents using social relation characters, comprising:
receiving search information from a main user;
searching contents in relation to the received search information from among contents possessed by the main user and related users in relation to the main user in an SNS server by using asocial network service (SNS) subscriber list of the main user and the related users and group information in relation to friendship in an SNS;
defining the searched contents as a first content group;
calculating a first interest index for each searched content based on additional information input by the related users;
determining a predetermined content, on which interest of the related users is focused, from the searched contents based on the calculated first interest index; and
calculating a second interest index equal (n*(a number of likability)) +a number of other users who have made comments +(m*(a number of sharing)), wherein n and m are numbers,
wherein the additional information comprises at least one of comment information, sharing information, or likability information.

13. The method according to claim 12, further comprising:
calculating the second interest index based on additional information input by other users than the main user and the related users with respect to each of the searched contents.

14. The method according to claim 13, further comprising:
extracting a keyword from comments input by the other users, from comments about the predetermined content on which interest of other users is focused,
searching a content in relation to the searched keyword at a web server other than the SNS server, and
defining the searched content as a third content group.

15. The method according to claim 14, further comprising:
displaying the contents of the first, second and third content groups to be independently arranged in a display area.

16. The method for collecting contents using social relation characters according to claim 12, further comprising:
extracting a keyword from comments input by the related users, among comments about the predetermined content on which interest of the related users is focused;
searching a content in relation to the extracted keyword from contents possessed by the main user and the related users in the SNS server; and
defining the searched content as a second content group.

17. The method for collecting contents using social relation characters according to claim 12, wherein n=0.5 and m=2.

18. An apparatus for collecting contents using social relation characters, comprising a processor that comprises:
an input unit configured to receive search information from a main user;
a database configured to store a social network service (SNS) subscriber list of the main user and related users in relation to the main user and group information in relation to friendship in an SNS; and a content managing unit comprising first and second sub content managing units, the content managing unit being configured to:

search contents in relation to the received search information from among contents possessed by the main user and the related users in an SNS server by using the group information, define the searched contents as a first content group, calculate a first interest index for each content included in the first content group based on additional information input by the related users, the additional information comprising at least one of comment information, sharing information, or likability information, and determine a predetermined content, on which interest of the related users is focused, from the searched contents based on the calculated first interest index, wherein the first sub content managing unit is configured to:

extract a keyword from comments input by the related users, among comments about the predetermined content on which interest of the related users is focused, search a content in relation to the extracted keyword from among contents possessed by the main user and the related users in the SNS server, and define the searched content as a second content group, and wherein the second sub content managing unit is configured to:

calculate a second interest index based on additional information input by other users than the main user and the related users with respect to each of the searched contents as: the second interest index $=(0.5 *(\text{the number of likability})) + \text{the number of other users who have made comments} +(2*(\text{the number of sharing}))$, and determine a predetermined content on which interest of other users is focused, from the searched contents based on the calculated second interest index.

\* \* \* \* \*